United States Patent [19]
Schwiebert

[11] 3,866,970
[45] Feb. 18, 1975

[54] TWIST LOCK CONTAINER SUPPORT

[76] Inventor: Phillip D. Schwiebert, 599 Greenleaf, Glencoe, Ill. 60022

[22] Filed: June 19, 1972

[21] Appl. No.: 263,981

[52] U.S. Cl.......... 296/35 A, 105/366 B, 248/361 R
[51] Int. Cl............................. B60p 1/64, B65j 1/22
[58] Field of Search... 296/35 A; 105/366 B, 366 C; 248/361 R

[56] References Cited
UNITED STATES PATENTS

| | | | |
|---|---|---|---|
| 3,163,129 | 12/1964 | Gutridge | 105/366 B |
| 3,204,579 | 9/1965 | Burns et al. | 105/366 B |
| 3,545,713 | 12/1970 | Larssen et al. | 105/366 B |
| 3,621,236 | 11/1971 | Hlinsky | 296/35 A |
| 3,737,135 | 6/1973 | Bertolini | 248/361 R |

FOREIGN PATENTS OR APPLICATIONS

| | | | |
|---|---|---|---|
| 1,922,758 | 11/1969 | Germany | 296/35 A |

*Primary Examiner*—David Schonberg
*Assistant Examiner*—John A. Pekar
*Attorney, Agent, or Firm*—Molinare, Allegretti, Newitt & Witcoff

[57] ABSTRACT

The improved twist lock container support is constructed so as to permit facile attachment, as a unit, to a trailer utilized for transporting freight containers. The improved container support may be mounted as by welding, to the trailer such as on its front and rear bolsters. Alternatively, the improved container support may be mounted on the side rail of a flat bed trailer or on the bolsters of a container chassis so that the container support may be selectively moved between a first position wherein it is disposed so as to be able to secure a conventional corner fitting of a freight container to the trailer and a second position wherein it is stowed below a horizontal plane defined by the cottom surfaces or bases of the containers so as to permit a single trailer to perform the dual-purpose role of handling containers as well as any other type of general freight. Also the improved container support may be mounted on the side rail of a flat bed trailer so that it may be selectively slid along the side rail of the trailer so as to permit the trailer to accommodate freight containers of various lengths.

16 Claims, 18 Drawing Figures

TWIST LOCK CONTAINER SUPPORT

BACKGROUND AND SUMMARY OF THE INVENTION

The present invention relates to an improved container support, and more particularly, to an improved twist lock container support which is adapted to be mounted on a trailer for transporting freight containers and which is adapted to secure a conventional, twist lock corner fitting of a freight container to the trailer during transport.

In the past, a variety of different types of twist lock containers supports have been utilized to secure a corner fitting of a freight container to a trailer. While these prior container supports have generally performed their intended function of securing freight container satisfactorily, the installation of these container supports on a trailer was a difficult and time-consuming task primarily because as designed, they could not be installed as a unit and also frequently required substantial, and thus expensive modification of the trailer structure. Furthermore, once installed, these prior container supports could not be moved along the side rail of the trailer, and thus the trailer could only be utilized to handle freight containers of one particular size.

Most of the prior container supports were permanently installed in an upright, container-securing position, and when the trailer was not loaded remained exposed above the plane of the deck of the trailer. One of the prior container supports was designed so as to permit the support to be moved from its upright, container-securing position until it was disposed below the plane of the deck of the trailer. However, the mechanism for permitting such movement was relatively bulky and cumbersome, and the container support had to be manually unbolted from its supporting trailer structural member each time before it could be moved from its container-securing position.

In contrast, the improved twist lock container support of the present invention is constructed so that it can be relatively quickly and easily mounted, as a unit, on a trailer with minimum modification to the trailer structure.

The construction of the improved container support of the present invention permits the components of the support to be built rugged enough for piggyback service, even during humping operations, yet still be assembled in a compact unit which can be mounted on a trailer without being disassembled and/or reassembled during the mounting operation. The construction also permits the twist lock operating mechanism utilized in the improved container support to be disposed with the structural member of the trailer to which the support is attached so as to thereby protect the mechanism from possible damage and tampering.

Another significant advantage of the improved container support of the present invention is its flexibility. The improved container support can not only be utilized, as the prior supports, in a fixed mounting situation, such as when welded to the front and rear bolsters of the trailer, but it also can be mounted in a trailer so that it may be moved relatively with respect to the trailer so as to permit the trailer to handle different sized freight containers and other types of general freight. More specifically, the impproved container support can be mounted on the side rail of the trailer so that it may be selectively moved or slid along the side rail. This permits a single trailer to be capable of transporting freight containers of different sizes; as for example, a 40 foot trailer is thus able to handle any total length, compatible combination of 10, 20, 24, 27, 30, 35 and 40-foot container lengths. In addition, the improved container support may be mounted on the trailer so that it may be readily, and without the necessity of first unbolting or unfastening any locking or securing means, moved between its normal upright, container-securing position and a second position wherein the container support is disposed completely below a generally horizontal plane defined by the bottoms or lower surfaces of the freight containers being transported. In other words, the improved container support is mounted so that it can be dropped down and stowed out of the way when not in use. This permits a single trailer to be capable of handling two 20-foot containers or a single 40-foot container by the simple expedient of either dropping down or flipping up the centrally disposed container supports, as well as permitting the trailer to be utilized to haul freight other that than containers when the improved supports are dropped down and stowed below the deck of the trailer.

Accordingly, it is a primary object of the present invention to provide an improved container support which is adapted to be mounted on a trailer for transporting freight containers and which is adapted to secure a conventional, twist lock corner fitting of a freight container to the trailer during transport. A related object of the present invention is to provide an improved container support of the type described wherein the improved container support may be facilely mounted, as a unit, on the trailer.

Still another object of the present invention is to provide an improved container support of the type described wherein the container support is mounted so that it may be selectively moved, in a fore-aft direction, with respect to the trailer thereby permitting the trailer to handle various different sized freight containers.

A further object of the present invention is to provide an improved container support of the type described wherein the container support is mounted so that it may be selectively moved between its upright container-securing position and a dropped down or stowed position where the support is disposed below the horizontal plane defined by the bottoms or lower surfaces of the freight containers when they are mounted on the trailer.

These and other objects and advantages of the present invention will become apparent to those skilled in the art from a reading of the following specification, and a review of the drawings.

The same reference numerals have been utilized to identify the same or like parts and assemblies throughout FIGS. 1–18. For ease of description, the terms "inner" and "outer" and "inwardly" and "outwardly" have been utilized to describe relative parts of the trailers and improved twist lock container support described and have been used with reference to the longitudinal axis or center line (or to a vertical plane including the longitudinal axis or center line of the trailer on which the improved supports are mounted. Likewise the terms "upper" and "lower" and "left" and "right" have been utilized with reference to the directions indicated to a person when viewing the FIGURES.

DESCRIPTION OF THE PREFERRED EMBODIMENTS

FIGS. 1–9 Embodiments

Figure 1:
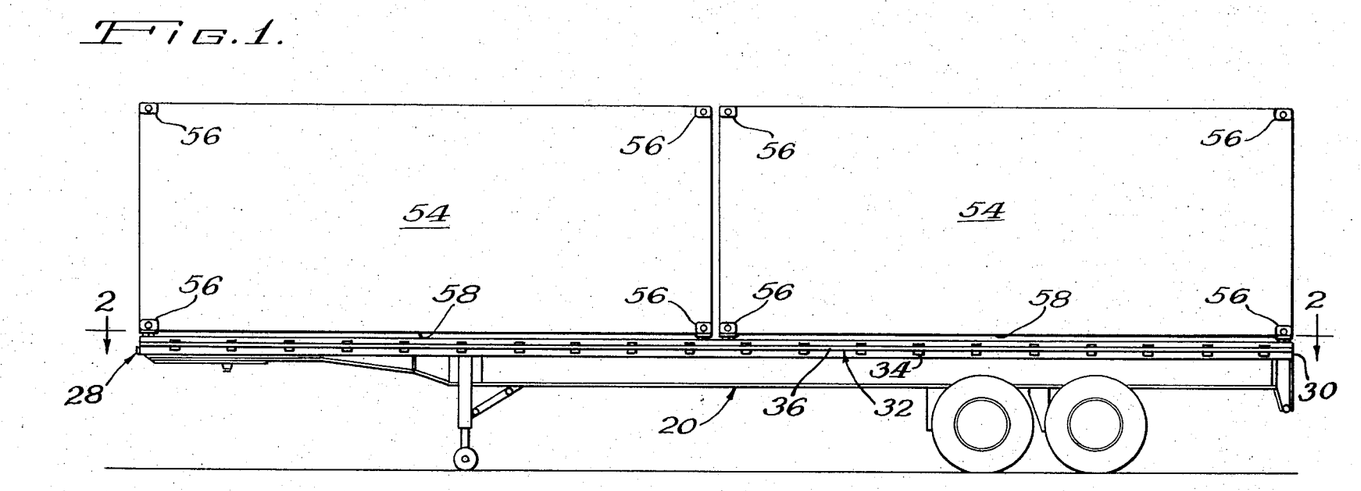
FIG. 1 is a side, plan view of a flat bed trailer which has two freight containers secured to its deck by a plurality of the improved twist lock container supports of the present invention.
Figure 2:
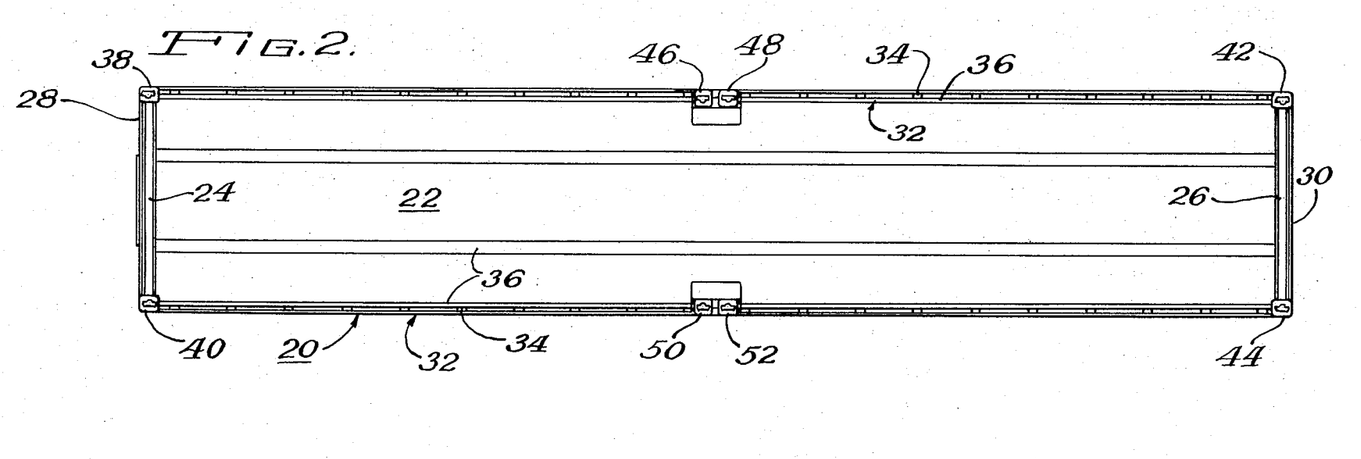
FIG. 2 is a top, plan view of the deck of the trailer shown in FIG. 1, with the freight containers removed therefrom.

As best shown in FIGS. 1 and 2, a flat bed trailer is indicated generally at 20. The trailer is of standard design and construction, except as noted hereinbelow, and includes a generally horizontally disposed, flat deck 22. Front and rear bolsters 24 and 26 extend across and generally define the front and rear ends 28 and 30, respectively, of the deck 22 of the trailer. Conventional channel side rails 32 serve to define the side margins of the deck 22. A plurality of conventional stake pockets 34 are secured at regularly spaced intervals along the channel side rails 32, and conventional rub rails 36 are secured to the outer sides of the stake pockets 34 and define the outer side dimensions of the trailer 20.

Eight improved twist lock container supports, embodying the principles of the present invention, are indicated generally at 38, 40, 42, 44, 46, 48, 50 and 52 and are mounted adjacent to the upper surface of the deck 22. More specifically and as best illustrated in FIG. 2, the container supports 38 and 40 are mounted adjacent to the front corners of the deck 22, and the container supports 42 and 44 are mounted adjacent to the rear corners of the deck. Midway between the front and rear ends 28 and 30 of the trailer, container supports 46 and 48 are mounted on one channel side rail 32 and container supports 50 and 52 are mounted on the other channel side rail.

As shown in FIG. 1, two freight containers 54 are secured to the deck 22 of the trailer by means of the container supports 38–52, as hereinafter described, and are arranged, end-to-end, so that they extend from the front end 28 of the trailer to its rear end 30. The freight containers 54 are of standard design and construction and include conventional twist lock fittings 56 at each of their corners. These twist lock corner fittings 56 are adopted to cooperate with the twist lock container supports 38–52 to secure the freight containers 54 to the trailer. When secured to the trailer 20, the bottoms or lower surfaces 58 of the freight containers 54 are spaced slightly above the deck 22 so as to provide a clearance between the bottoms 58 and the deck for the blades of fork lifts and the like.

Figure 3:
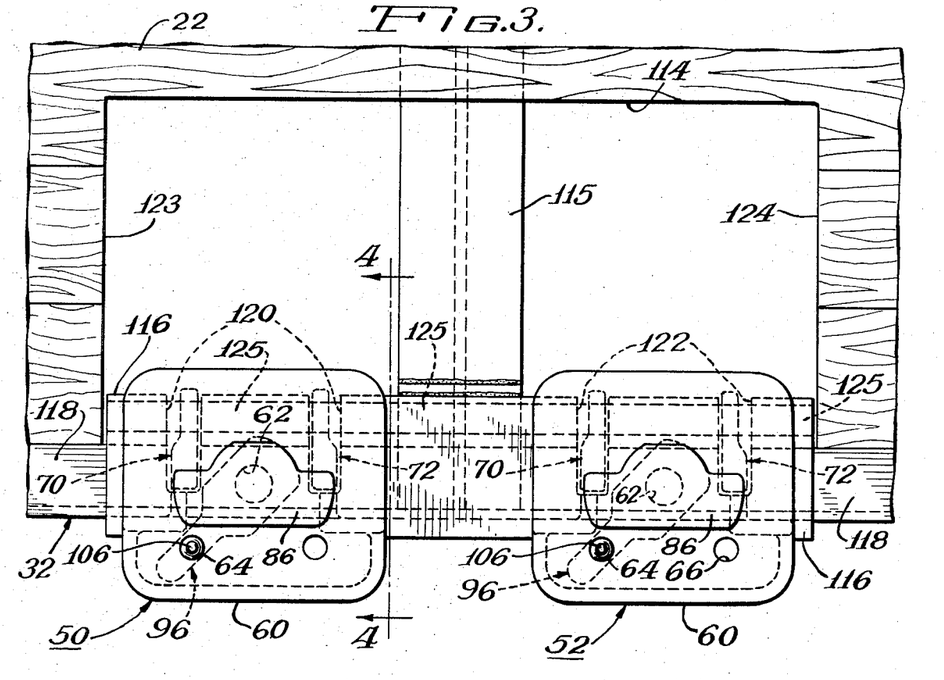
FIG. 3 is an enlarged, plan view of two of the centrally disposed, improved container supports utilized on the trailer shown in FIG. 2.
Figure 4:
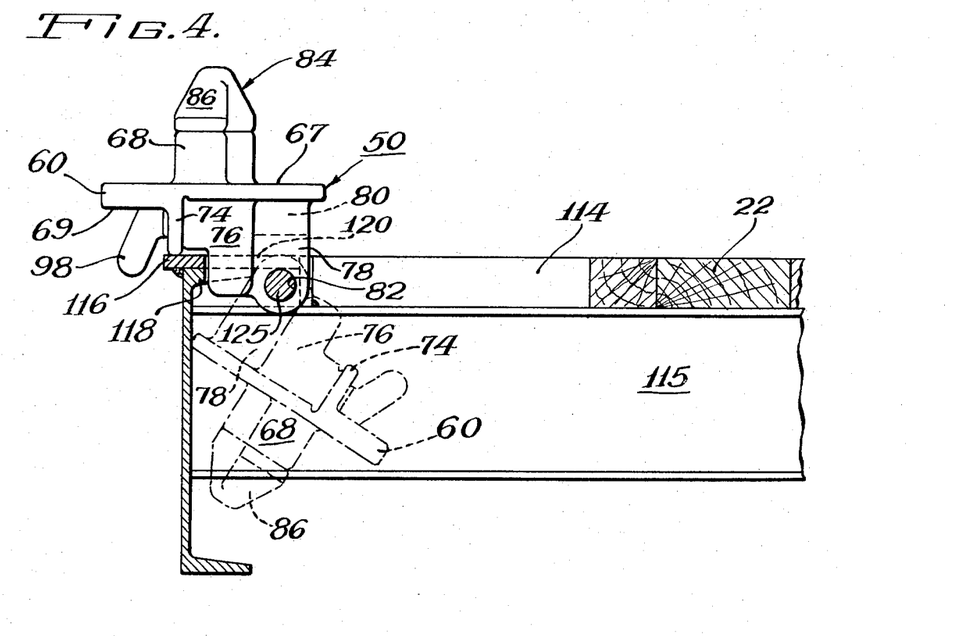
FIG. 4 is a view taken along the line 4—4 in FIG. 3, with the improved container support being shown in phantom in its dropped down or stowed position.
Figure 5:
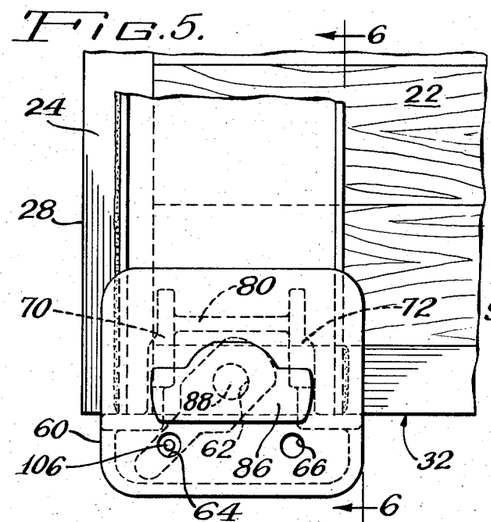
FIG. 5 is an enlarged, plan view of the improved container support mounted on the left hand corner of the deck of the trailer shown in FIG. 2, with the cone of the container support being positioned so that the corner fitting of a freight container may be fit over the container support.
Figure 6:
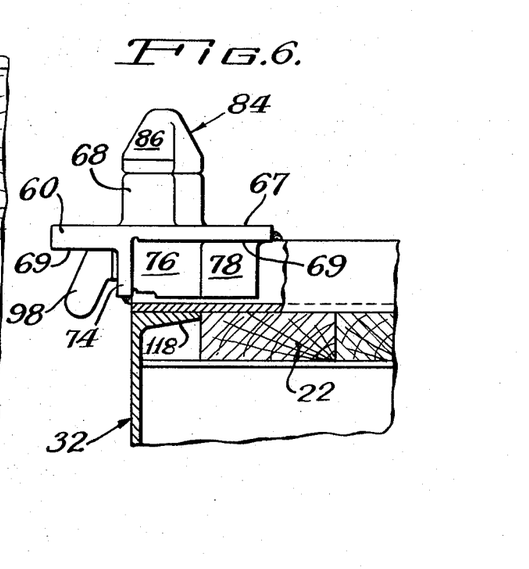
FIG. 6 is a view taken along the line 6—6 in FIG. 5.

All of the container supports 38–52 have basically the same structure and mode of operation, with the principal difference between them being the manner in which they are mounted on the trailer 20. As best illustrated in FIGS. 3 and 4, the container supports 46–52, i.e. the container supports mounted between the ends of the trailer 20 on the side rails 32, are mounted so that they can selectively be dropped down and stowed out of the way below the plane of the deck 22. This provides maximum flexibility in the utilization of the trailer in that it permits the trailer to handle not only two freight container, such as the containers 54, but also to handle a single large freight container that extends from one end 28 to the other end 30 or if desired, general freight, either alone or with one such containers 54. In contrast and as best illustrated in FIGS. 5 and 6, the container supports 38–40, i.e. the container supports mounted adjacent to the corners of the trailer, are mounted, by welding, to the end bolsters 24 and 26 so that these container supports can not be moved relative to the trailer. As a result of compact design and construction of the improved container support of the present invention, the utilization of the support container 38–44 affords a significant, practical advantage in comparison with prior container supports since they can be mounted as a completely assembled unit and thus can be mounted relatively quickly and with a minimum modification to the bolsters 24 and 26.

Referring now to FIGS. 3–9, each of the container supports 38–52 includes a generally rectangular, preferably casted, platform 60 which is horizontally disposed, and which is positioned slightly above the plane of deck 22, when the container supports are in their freight container securing positions. The platform 60 has a centrally located aperture 62 formed therein, with the axis of the aperture 62 being substantially vertically disposed. Two other apertures 64 and 66 are also formed in the platform 60 so that their axes are parallel to the axis of aperture 62, and are spaced from each other approximately 90° along an arc formed about the axis of the aperture 62.

The upper surface 67 of the platform 60 has a generally annular abutment 68 which is integrally formed about, and in effect extends the length of, the aperture 62 and which projects upwardly from the upper surface 67. The lower surface 69 of the platform 60 has two, generally L-shaped, downwardly depending projections 70 and 72 integrally formed thereon. Each of these projections 70 and 72 includes a stop portion 74, a locking lug portion 76 and a bolt attaching portion 78, with the locking lug portion 76 and the attaching portions 78 of the projection 70 being disposed in a vertical plane that is parallel to the vertical plane in which the portions 76 and 78 of the projection 72 are disposed. The projections 70 and 72 are formed so that when the platform 60 is mounted on a trailer in its container securing position, the base of the L-shaped projections 70 and 72, i.e., the stop portions 74, lie in a common vertical plane which is parallel to the vertical plane of the side rail 32, and so that the vertical planes containing the locking lug portions 76 and attaching portions 78 are generally perpendicular to the vertical plane of the side rail, and are equi-spaced from the axis of the aperture 62. The attaching portions 78 are interconnected by a reenforcing webb 80 and have coaxial apertures 82 formed therein for receiving a horizontally disposed bolt. With respect to the various portions of the projections 70 and 72, the attaching portions 78 project downwardly furtherest from the lower surface 69 of the platform 60 while the stop portions 74 project downwardly the least; and the attaching portions 78 are disposed adjacent to the inner, side edge of the platform while the stop portions 74 are disposed adjacent to the outer, side edge of the platform.

A locking cone 84 is mounted on the platform 60 and includes a head 86 which rests on the abutment 68 and a shaft 88 which extends downwardly through the aperture 62 in the platform. The shapes of the head 86 and the abutment 68 are designed so that the head and abutment can project within the standard head receiving opening in a twist lock corner fitting, such as fitting 56.

Figure 8:
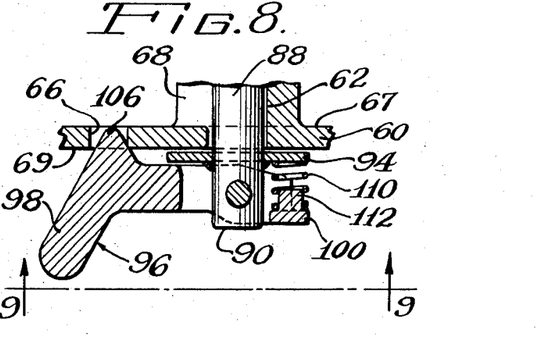
FIG. 8 is a view taken along the line 8—8 of FIG. 7.
Figure 9:
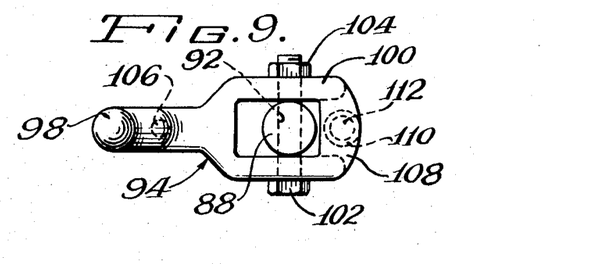
FIG. 9 is a view taken along the line 9—9 of FIG. 8.

As seen in FIGS. 8 and 9, the lower end 90 of the shaft 88 projects below the lower surface 69 of the platform and has a transverse bore 92 therein. A washer 94 is disposed about and welded to the shaft 88, adjacent to the lower surface 69 of the platform so that the washer 94 rotates with the shaft 88 and so that the washer limits relative movement between the shaft and the aperture 62 in a direction parallel to the axis of the aperture.

An operating handle 96 is positioned beneath the lower surface 69 of the platform 60 and includes a first, downwardly bent end 98 and a second, bifurcated end 100. The first end 98 is adapted to be gripped by a person operating the container support and is disposed adjacent to and beneath the outer side edge of the platform 60. The second end 100 fits about and is pivotally connected to the lower end 90 of the shaft 88 by means of a threaded bolt 102 which extends through the transverse bore 92 and two aligned bores in the bifurcated end 100 of the handle 96 and which is held in place by a unit 104. Intermediate its ends, the handle 96 includes an upwardly projecting nipple 106 which is positioned, with respect to the pivotal connection between the handle 96 and the shaft 88, so that it can extend within either of the apertures 64 and 66. The second end 100 also includes a member 108 that extends between the ends of the bifurcated arm portions. A coil compression spring 110 is disposed between the member 108 and the washer 94, and biases the first end 98 of the handle 96 upwardly so that the nipple 106, if aligned, will extend into the apertures 64 and 66. The cooperation between the nipple 106 and the apertures 64 and 66 acts to prevent accidental movement of the handle 96. A spring guide 112 is carried by the member 108 and supports the lower end of the spring 110.

Figure 7:
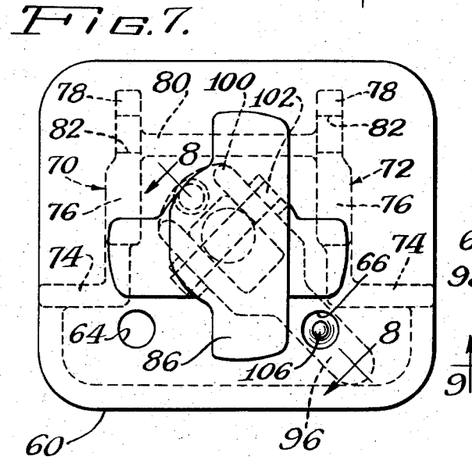
FIG. 7 is an enlarged view of the container support shown in FIG. 5, with the cone of the improved container support being disposed in a position wherein the cone will lock a corner fitting of a freight container to the container support.

An improved container support of the present invention operates as follows: When the head 86 of the cone 84 is positioned as shown in FIG. 5, a corner fitting 56 of a freight container may be set down on the container support since the head 86 and abutment 68 can be received within the cone-receiving opening in fitting 56. When the corner fitting 56 is set down on the container support, the lower surface of the fitting will rest on and be supported by the upper surface 67 of the platform 60. In order to move the head 86 so as to secure the fitting 56 to the container support, and with specific reference to FIGS. 5, 6, and 8, the first end 98 of the handle 96 must be pivoted downward, about the bolt 102 and against the bias of the spring 110, until the nipple 106 no longer extends within the aligned aperture 64. Thereafter, the handle 96 must be moved to the right, in a generally horizontal plane, through an arc of approximately 90° until the nipple 106 is aligned with the aperture 66. This rotary movement of the handle 96 causes a corresponding movement of the head 86 as that the head 86 is positioned in its fitting securing position as shown in FIG. 7. Thereafter, release of the handle 96 causes in the nipple 106 to be positioned within the aperture 66 as a result of the bias of the spring 110. Of course, return movement of the handle 96 from the position in FIG. 7 to that in FIG. 5 results in movement of the head 86 from its position in FIG. 7 to that in FIG. 5 wherein head 86 will again permit the corner fitting 56 to be lifted off of the container support.

As noted above, the two pairs of container supports 46–52 are mounted on the trailer 20 in such a manner that they can selectively be dropped down and stowed below the deck 22. Since the means of mounting both pairs of container supports 46 and 48 and 50 and 52 is identical, only the means for mounting supports 50 and 52 will be described in detail herein.

As best illustrated in FIGS. 3 and 4, a portion of the deck 22 is cut-away, as indicated at 114, adjacent to the side rail 32 and to the midpoint between the ends 28 and 30 of the trailer. The trailer 20 includes a transverse I-beam 115 which bisects the portion 114 and which extends between the channel side rails 32 and reinforces the trailer and the deck 22 so that the cutting away of the portion 114 does not significantly weaken the trailer. A horizontally disposed plate 116 is secured, as by welding, the upper flange 118 of the channel side rail 32. The length of the plate 116 is substantially the same as the length of the cut away portion 114 and the width of the plate 116 is slightly larger than the width of the flange 118 so that the plate overlies and extends beyond the both side edges of the flange 118. Two pair of slots 120 and 122 are cut in the inner edge of the plate 116 and flange 118, with the pair of slots 120 being located midway between the front ends 123 of the cut away portion 114 and the beam 115 and with the other pair of slots 122 being located midway between the rear end 124 of the portion 114 and the beam 115.

The container supports 50 and 52 are positioned on the plate 116 so that the lug portions 76 and shaft receiving portions 78 of the projections 70 and 72 are disposed within the slots 120 and 122 and so that the stop portions 74 rest on the upper surface of the plate 116 adjacent to the outer side edge of the plate as shown in FIGS. 3 and 4. A shaft 125 is secured, as by welding, to the undersurface of the plate 116 adjacent to the inner side edge of the plate. The shaft 125 extends through the coaxial apertures 82 in the shaft receiving portions 78 of the projections 70 and 72 of the container support 50 and 52 and thus permits the container supports to be manually pivoted about its axis between a first position wherein the platform 60 is generally horizontally disposed, i.e., such as shown in the solid line position in FIG. 4, and second position wherein the container support is stowed completely below the horizontal plane which includes the bottoms 58 of the freight containers 54 on the trailer i.e., such as shown in the phantom line position in FIG. 4. In other words, when the container supports 50 and 52 are in their second positions, they are stowed below the deck 22, and therefore,, do not obstruct the use of the deck for other purposes.

When the container support 50 is in its first position, i.e., in the solid line position in FIG. 4, the lug positions 76 of the projections 70 and 72 are disposed in the slots 120 in the plate 116 and flange 118. The width of the lug portions 76 is slightly less than the width of the slots 120 so that the cooperation between these lug portions and the slots serve to reinforce the strength of the mounting between the container support and trailer, particularly with respect to "fore-aft" directed forces which may act on the trailer during humping operations. The same is true for the lug portions 76 formed on the container support 52 and the slots 122 when the support 52 is in its first position.

As noted above, the container supports 38–44 are mounted in the corners of the trailer 20. Since all the supports 38–44 are mounted in a similar manner, only the means of mounting container support 40 will be described in detail herein.

As best shown in FIGS. 5 and 6, the end bolster 24, preferably reinforced, has a generally U-shaped transverse channel 126 which is secured thereto and which extends from one end of the bolster 24 to the other. The open ends 128 of the channel 126 face upwardly, and the distance between the ends 128 of the channel 126 is greater than the distance between the planes containing the lug portions 76 and attaching portions 78 of the projections 70 and 72 but is less than the length of the platform 60, i.e., the dimension of the platform in the direction parallel to the longitudinal axis of the side rail 32. For mounting, the container support 40 is positioned on the channel 126 so that the platform 60 rests on and is supported by the upstanding sides 128 of the channel and so that the inner surfaces of the stop portions 74 of the projections 70 and 72 abut the ends of the sides 128. Thereafter the container support 40 is secured to the channel 126 by welding. The principle advantages of this method mounting is that the contnainer support can be mounted relatively quickly and easily and without the necessity of disassembling and re-assembling the container support during mounting. Moreover, when mounted, the second end 100 of the operating handle 96, and the associated parts, are disposed within the channel 126 and thus, are protected. In some instances and depending on the height of the sides 128, the lower parts of the portions 76 and 78 may have to be cut away as shown in FIG. 6 so that the projections 70 and 72 will fit within the channel.

FIGS. 10–14 Embodiment

Figure 10:
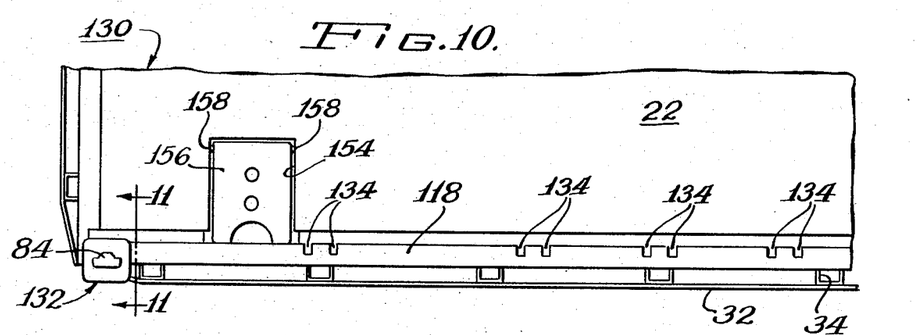
FIG. 10 is an enlarged, top plan view of a flat bed trailer, similar to the trailer shown in FIG. 1, which has an improved twist lock container support of the present invention mounted on the side rail of the trailer so that the container support may be selectively moved along the side rail whereby freight containers of various lengths can be secured to the trailer.

In FIGS. 10–14, another means of mounting an improved container support of the present invention is illustrated. More specifically FIG. 10 shows a corner portion of a trailer 130 which has an improved container support 132 of the present invention mounted thereon so that the container support 132 can selectively be moved along the side rail 32 of the trailer. Except as hereinafter set forth, the structure of the trailer 130 and container support 132 are identical to that of trailer 20 and supports 38–52, respectively.

The upper flange 118 of the channel side rail 32 has a plurality of pairs of slots 134 cut therein, with the pairs of slots 134 being spaced along the flange 118 at intervals determined so that the trailer 130 is able to handle various different sized freight containers. The distance between the slots comprising a pair is the same as the distance between the lug portions 76 of the projections 70 and 72 which depend from the platform 60 of the container support 130.

A slide plate 136 is mounted in the upper flange 118 of the side rail 32, and has the container support 130 secured thereto. As best shown in FIGS. 11–14, the plate 136 includes a horizontally disposed portion 138 which rests on the upper surface of the flange 118, which has a width greater than the width of the flange and which has a length, i.e., the dimension in the direction parallel to the longitudinal axis of the side rail 32, less than the distance between the two slots in the pairs of slots 134. An enlarged portion 140 is integrally formed on the inner end of the portion 138 and is disposed slightly below the inner edge of the flange 118 and between the inner edge of the flange 118 and the center line of the trailer. A transverse bore 142 is drilled in the portion 140 and is adopted to be aligned with the coaxial bores in the attaching portion 78 of the projections 70 and 72. A threaded bolt 144 extends through the bore 142 and the coaxial bores in the portions 78 so that the container support 130 can selectively be pivoted about the axis of the bolt 144 and with respect to the plate 136. A nut 146 holds the bolt 144 in place.

An integral extension 148 is formed in the portion 140 and extends outwardly from the portion 140 and under the flange 118 to a point adjacent to the vertical wall section 150 of the channel side rail 32. In other words, together the portion 138, the portion 140 and the extension 148 form a generally U-shaped member which fits relatively snuggly about the inner end of the flange 118, but which permits relative, sliding movement between the plate 136 and the flange 118 in a direction parallel to the longitudinal axis of the side rail 32. An integral side portion 152 is formed on the outer end of the portion 138 and depends therefrom a plane parallel to the plane of the section 150 of the channel 32. The width of the portion 138 is selected so that the inner surface of the portion 152 is in surface-to-surface contact with the outer surface of the section 150 when the plate 136 is mounted on the flange 118 such as shown in FIGS. 11–14. The length of the portion 152 is greater than the distance between the slots in the pairs of slots 134 and the portion 152 extends downwardly from the portion 138 for a sufficient distance so that the plate 136 cannot be removed from the flange 118.

Figure 11:
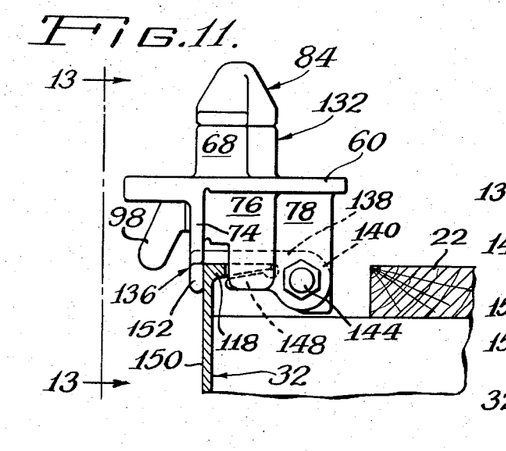
FIG. 11 is a partial, vertical cross-sectional view taken along the line 11—11 in FIG. 10.

As shown in FIGS. 11–14, when the container support 132 is in its first position, i.e., in its horizontally disposed, freight container securing position shown in FIG. 11, the stop portions 74 of the projections 70 and 72 rest on the upper end of the side portions 152, and the lug portions 76 of the projections 70 and 72 are positioned within the slots 134. The cooperation between the portions 76 and the slots 134 prevent any relative sliding movement between the plate 136 and the side rail 32 as long as the container support 132 is in its first position. When it is desired to move the container support 132 along the side rail 32, the support 132 is pivoted upwardly, through an arc of approximately 45°, about the axis of the bolt 144 i.e., from the position shown in FIG. 11 to that shown in FIG. 12. As long as the container support 132 is retained in the position shown in FIg. 12, the plate 136, and thus the support 132, may be freely slid along the upper flange 118 of the side rail 32. Of course, when the plate 136 is again positioned between any of the other pairs of slots 134, the container support 132 can be returned to its first position whereupon the plate 136 and the support 132 will again be rendered immobile with respect to relative sliding movement.

Figure 12:
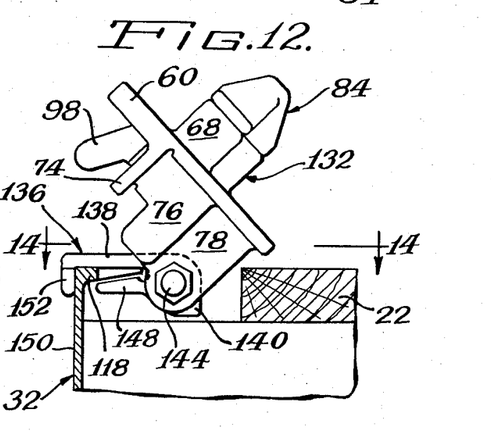
FIG. 12 is a partial, vertical cross-sectional view similar to that shown in FIG. 11, but with the improved container support being moved to a position wherein the container support can be moved axially along the side rail of the trailer.
Figure 13:
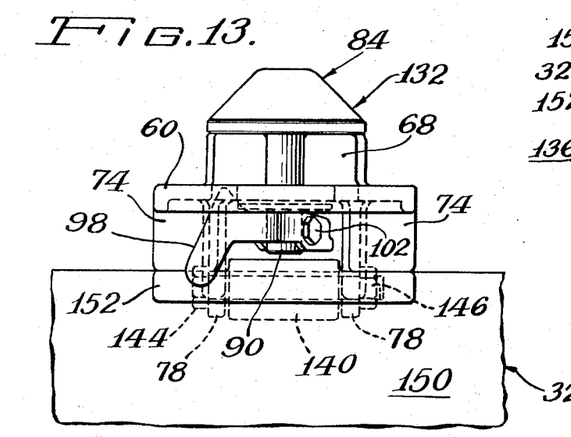
FIG. 13 is a view taken along the line 13—13 of FIG. 11.
Figure 14:
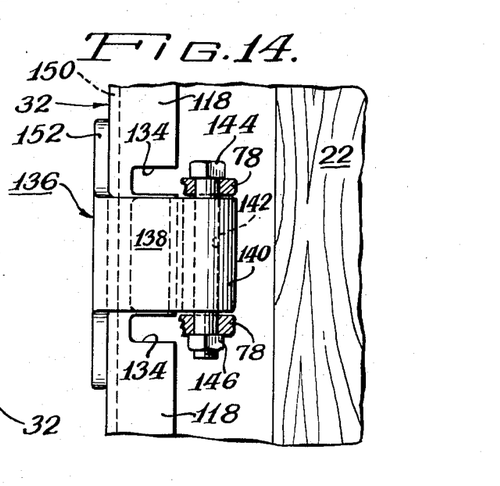
FIG. 14 is a view taken along the line 14—14 of FIG. 12.
Figure 15:
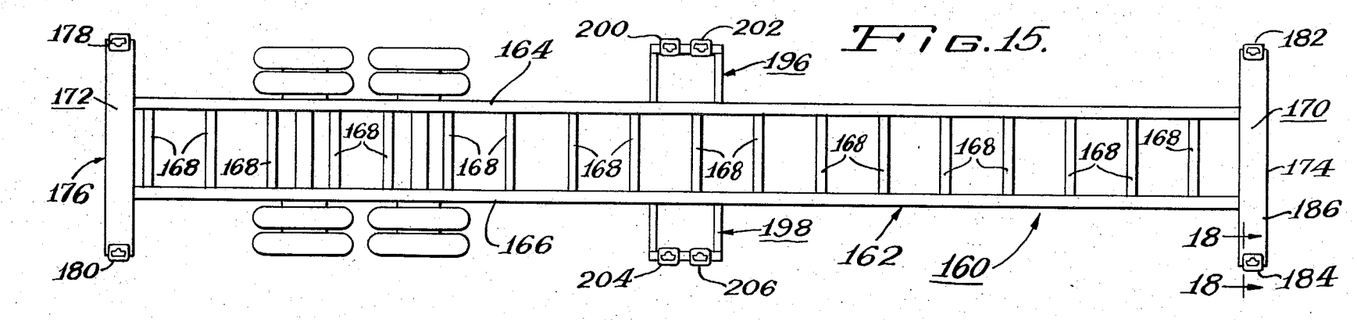
FIG. 15 is a top plan view of trailer having a skeletal chassis which is designed to transport freight containers and which utilized the improved container supports of the present invention.
Figure 16:
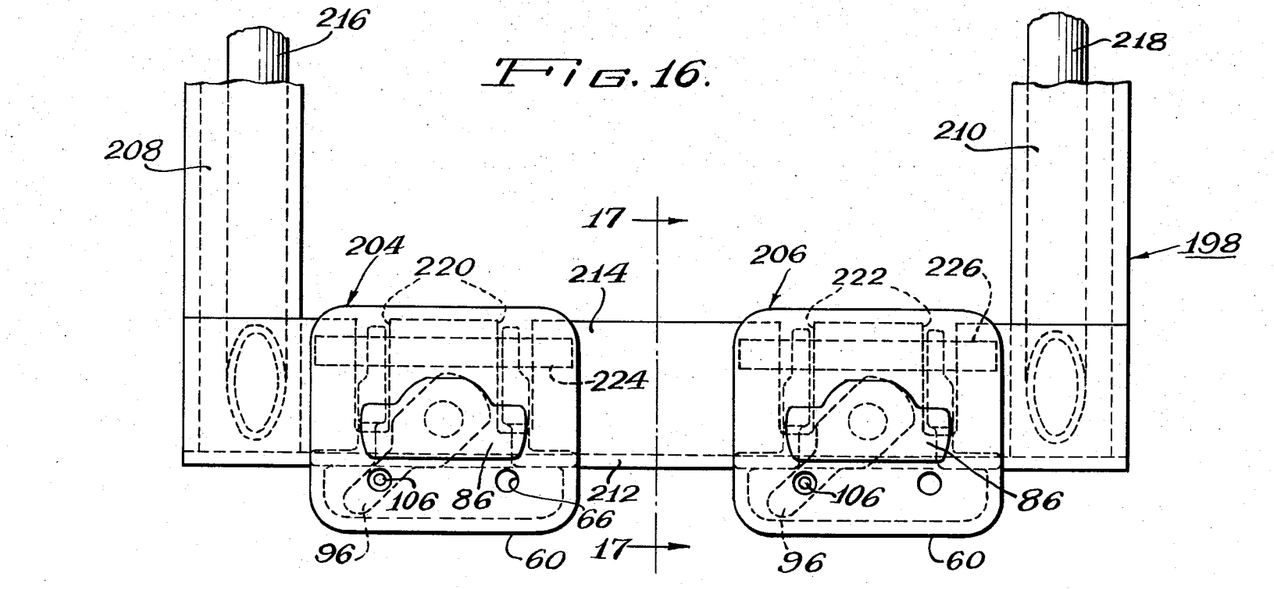
FIG. 16 is an enlarged view of one of the centrally disposed pair of improved container supports mounted on the trailer shown in FIG. 15.

The container support 132 may also be dropped down out of the away and stowed below the deck 22 of the trailer 130 in substantially the same manner as the container supports 46–52. For this purpose, a portion of the deck 22, adjacent to the side rail 32, is cut away as indicated at 154. When it is desired to stow the container support 132, the support 132 is pivotally moved upwardly from its position shown in FIG. 11 to the position shown in FIG. 12. The plate 136 and container support 132 are then slid along the side rail 32 until they are adjacent to the cut away portion 154. Thereafter the support 132 is further pivoted (clockwise as shown in FIG. 11 and 12) aboutu the axis of bolt 144 until it is disposed below the plane of the deck 22, i.e., until it is disposed in a position similar to the phantom line position of support 50 in FIG. 4.

As shown in FIG. 10, a plate 156 may be employed to cover the cut away portion 154. The plate is pivotally connected to the deck 22, adjacent to the inner end of the plate, by means of hinge pins 158.

FIGS. 15–18 Embodiment

In FIGS. 15–18, a trailer 160 is shown which is designed and constructed exclusively for transporting freight containers. More specifically, the trailer 160 is designed to handle either a single large (e.g. 40-foot) flat bottom or tunnel-type freight containers or two smaller (e.g. 20-foot) containers.

The trailer 160 does not include a deck, such as the deck 22, but has only a frame chassis 162. The chassis 162 comprises two spaced apart, parallel, I-beam main rails 164 and 166 which are interconnected at regularly spaced intervals long their lengths by a plurality of transverse cross members 168. Front and rear bolsters 170 and 172 are secured to and interconnect the front and rear ends 174 and 176, respectively, of the rails 164 and 166. The ends of the bolsters 170 and 172 project outwardly from the rails.

Four improved twist lock container supports 178, 180, 182 and 184 of the present invention are mounted, one at each end, to the outwardly projecting ends of the bolsters 170 and 172. The container supports 178–184 are structurally and functionally identical to the supports 38–52 and 132 described herein except that the apertures 82 need not be included in the attaching portions 78 of the projections 70 and 72.

Since the container supports 178–182 are all mounted on the ends of the bolsters 170 and 172 in the same manner, only a detailed description of the manner by which support 184 is mounted on the end 186 of the front bolster 170 is included herein.

In order to be able to accommodate the container support 184, the side end member 188 of the bolster 170 is notched, as at 190, adjacent to its upper edge and the top member 192 of the bolster is likewise notched, as at 194, adjacent to its outer edge. The size of the notches 190 and 194 are selected so that the portions 76 and 78 of the projections 70 and 72 can fit within the bolster 170. The inner edge of the platform 60 rests on the outer edge of the top member 192, and the bottom edge of the portions 74 of the projections 70 and 72, rest on and are adjacent to the upper edge of the member 188. Welding is utilized to secure the container support 184 within the notched end 186 of the bolster 170.

In order to permit the trailer 160 to be able to handle two small freight containers, as well as a single large container, a pair of center bolsters 196 and 198 are mounted to the outer sides of the rails 164 and 166, respectively. Two container supports 200 and 202 are mounted on the bolster 196 and two other supports 204 and 206 are mounted on the bolster 198. All of the container supports 200–206 are mounted so that the supports can be dropped down out of the way and stowed below the plane of the bottom of the freight container being transported on the trailer 160. Since both of the bolsters and all four of the container supports 200–206 are structurally and functionally identical, only bolster 198 and support 206 is described herein in detail.

The container support 206 is structurally and functionally identical to the supports 46–52 and is mounted on the bolster 198 in a manner identical to that used to mount the supports 46–52 except as hereinafter noted. The bolster 198 includes two parallel, spaced-apart channels 208 and 210 which are secured, at their inner ends, to the rail 166, adjacent to its midpoint, and which project perpendicularly outwardly from the rail 166. The outuer ends of the channels 208 and 210 are interconnected by an inverted L-shaped angle 212 whose base flange 214 overlays and rests on the upper flanges of the channels 208 and 210. The beams 208 and 210 and angle 212 are welded together and are braced by a pair of reinforcing members 216 and 218 which extend from the beam 166 to the outer ends of the channels 208 and 210.

Figures 17, 18:
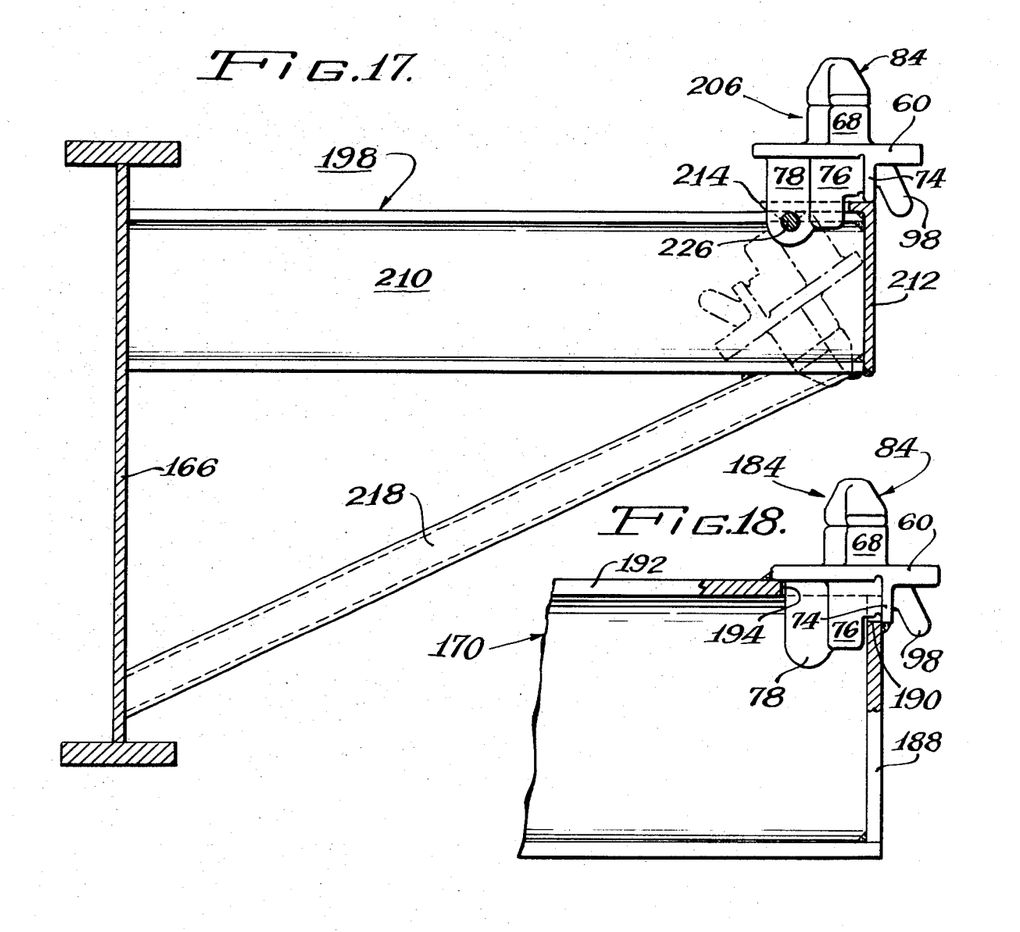
FIG. 17 is a partial, vertical cross-sectional view taken along the line 17—17 in FIG. 16, with the improved container support being shown in phantom in its dropped down or stowed position.
FIG. 18 is a partial vertical cross-sectional taken along the line 18—18 in FIG. 15.

The flange 214 of the angle 212 has two pairs of slots 220 and 222 cut in its inner edge, with the two slots in each pair of slots 220 and 222 being spaced from each other so that the portions 76 and 78 of the projections 70 and 72 of the container supports 204 and 206 can be disposed therein when the supports 204 and 206 are in their upright, container securing positions, i.e., the solid line position shown in FIG. 17. Shafts 224 and 226 are secured, as by welding, to the lower surface of the flange 214, adjacent to its inner edge, and beneath the pairs of slots 220 and 222, respectively. The shafts 224 and 226 extend through the coaxial apertures 82 formed in the projections 70 and 72 of the container supports 206 and 204, respectively. This manner of mounting permits the supports 204 and 206 to be pivoted, about the axes of shafts 224 and 226, between their upright, container securing positions, as shown in solid line in FIG. 17, and their stowed positions, as shown in phantom line in FIG. 17.

As noted above, when the container supports 200–206 are in their upright container securing positions, the trailer 160 can handle two smaller (e.g., 20-foot) freight containers. When the supports 200–206 are in their stowed positions, the trailer can handle a single large (e.g., 40-foot) freight container. And as a result of this, the utility of the trailer 160 is greatly increased.

In summary, my invention permits the construction of an improved container support which is rugged and compact and which may be relatively quickly and easily mounted, as a unit, on a standard trailer with a minimum of modification to the trailer. In addition, the design of the improved container support of the present invention permits it to be mounted on a trailer in variety of different ways and this significantly increases the flexibility of the trailer.

Finally from the foregoing, it should be apparent to those skilled in this art that various modifications and changes could be made in the container supports described hereinabove without departing from the spirit of my invention. For example, the shafts 224 and 226 could be mounted on the upper surface of the flange 214, rather than beneath it, if of course, the coaxial apertures 82 were correspondingly repositioned. Therefore, while a detailed description of the preferred embodiments of the present invention has been provided hereinabove, it is to be understood that all equivalents obvious to those having ordinary skill in this art are to be included in the scope of my invention as claimed.

I claim:

1. An improved twist lock container support which is adapted to be attached to a trailer for transporting freight containers and which is adapted to secure a conventional, twist lock corner fitting of a freight container to the trailer during transport, the improved container support comprising:

a platform including a first aperture therein having a generally vertical axis and including first detent means on the lower surface thereof, with the first detent means being spaced from and about said vertical axis of the first aperture;

means for mounting the platform to a structural member of the trailer, adjacent to the periphery of the trailer, and for positioning the platform in a first position wherein the platform is disposed in a generally horizontal plane defined by the bottom surface of the freight containers transported on the trailer;

a locking cone which is carried by the platform and which includes a head portion that projects upwardly above the upper surface of the platform and a shaft portion that is connected at one end to the head portion and that extends through the first aperture in the platform such that its other end is below the lower surface of the platform, the head portion of the locking cone being adapted to be rotatably moved, about said vertical axis and with respect to the platform, between a first position wherein the head portion can be received within the aperture of the corner fitting of a freight container positioned on the trailer such that the corner fitting rests on the upper surface of the platform and a second position wherein the head portion secures the corner fitting and the container support;

an operating handle, disposed below the plane of the platform, having its one end projecting from said vertical axis toward the periphery of the trailer so that the one end can be grasped by a person actuating the container support and having its other end projecting inwardly beyond said vertical axis;

means for connecting the operating handle, intermediate its ends, with the othehr end of the shaft portion of the cone so that rotational movement of the operating handle, about said vertical axis and in a plane substantially parallel to said horizontal plane, results in a corresponding rotational movement of the head portion of the cone, with the connection means also permitting limited vertical pivotal movement of the handle with respect to the shaft portion of the cone;

second detent means carried by the operating handle between the connection means and the one end of the operating handle, such that the second detent means may selectively cooperate with the first detent means; and means for resiliently biasing the operating handle so that the second detent means is normally biased upwardly against the lower surface of the platform, the biasing means including a spring disposed between the other end of the operating handle ad the lower surface of the platform and normally biasing the other end of the operating handle downwardly away from the lower surface of the platform.

2. The improved container support described in claim 1 wherein an annular plate is disposed about and secured to the shaft portion of the cone between the lower surface of the platform and the connection means so that the plate rotates about said vertical axis with the shaft portion of the cone; and wherein the resilient means is disposed between the other end of the operating handle and the plate.

3. The improved container support described in claim 1 wherein the mounting means includes means for connecting the platform with the trailer so that the platform may be pivotally moved about a generally horizontal axis between its first position and a second position wherein the container support is disposed below said horizontal plane.

4. The improved container support described in claim 3 wherein the trailer has a deck and a side rail which includes an upward, inwardly directed flange and which extends along and defines the sides of the deck of the trailer; and wherein the platform is mounted on the upper flange of the side rail of the trailer.

5. The improved container support described in claim 1 wherein the trailer has a deck and a side rail which includes an upward, inwardly directed flange and which extends along and defines the sides of the deck of the trailer; and wherein the platform is mounted on the upper flange of the side rail of the trailer.

6. The improved container support described in claim 5 which includes a second plate; means for mounting the second plate on the upper flange of the side rail of the trailer; and wherein the platform is mounted on the second plate.

7. The improved container support described in claim 6 wherein a member is formed on the platform and depends from the lower surface of the platform such that the lower end of the depending member is below said horizontal plane; and wherein the mounting means includes means for connecting the lower end of the depending member with the second plate so that the platform may be pivotally moved about a generally horizontal axis between its first position and a second position wherein the container support is disposed below said horizontal plane.

8. The improved container support described in claim 6 wherein the means for mounting the second plate on the upper flange of the side rail includes means for permitting the second plate to be selectively moved along and relative to the side rail, in a direction parallel to the longitudinal axis of the side rail.

9. The improved container support described in claim 8 wherein the upper flange of the side rail has a plurality of notches therein at predetermined intervals along its length, said intervals being spaced along the side rail in accordance with the different lengths of the freight containers to be transported on the trailer; wherein the platform has at least one depending lug formed thereon which extends downwardly from the lower surface of the platform and which is adapted to extend within an aligned notch when the platform is in its first position; and wherein the mounting means includes means for permitting the platform to be rotated, about a generally horizontal axis and with respect to the side rail, from its first position to another position where the lug is withdrawn from within the aligned notch and where the platform can be moved along and relative to the side rail, in a direction parallel to the longitudinal axis of the side rail.

10. The improved container support described in claim 9 wherein a member is formed on the platform and depends from the lower surface of the platform such that the lower end of the depending member is below said horizontal plane; and wherein the mounting means includes means for connecting the lower end of the depending member with the second plate so that the platform may be pivotally moved about said horizontal axis between its first position and a second position wherein the container support is disposed below said horizontal plane.

11. The improved container support described in claim 10 wherein an annular plate is disposed about and secured to the shaft portion of the cone between the lower surface of the platform and the connection means so that the plate rotates about said vertical axis with the shaft portion of the cone; and wherein the resilient means is disposed between the other end of the operating handle and the plate.

12. An improved twist lock, container support which is adapted to be attached to a trailer for transporting freight containers and which is adapted to secure a corner fitting of a freight container to the trailer during transport, the improved container support comprising:

a platform including a first aperture therein having a generally vertical axis and including at least one lug formed thereon, with the lug depending from the lower surface of the platform;

means for mounting the platform on a portion of a structural member of the trailer, adjacent to the periphery of the trailer, and for positioning the platform in a first position wherein the plaform is disposed in a generally horizontal plane defined by the bottom surfaces of the freight containers transported on the trailer, the mounting means including means for connecting the platform to the trailer so that the platform may be pivotally moved about a generally horizontal axis between its first position and a second position wherein the container support is disposed below said horizontal plane;

at least one notch formed in the portion of the structural member, with the notch being positioned, with respect to the platform, so that the lug is adapted to extend therein when the platform is in its first position and with the lug being withdrawn from within the notch when the platform is moved from its first position;

a locking cone which is carried by the platform and which includes a head portion and a shaft portion that is connected at one end to the head portion that projects upwardly above the upper surface of the platform and that extends through the first aperture in the platform such that its other end is below the upper surface of the platform, the head portion of the locking cone being adapted to be rotatably moved, about said vertical axis and with respect to the platform, between a first position wherein the head portion can be received within the aperture of the corner fitting of a freight container positioned on the trailer such that the corner fitting rests on the upper surface platform and a second position wherein the head portion secures the corner fitting and the container support;

an operating handle, disposed below the plane of the platform, having its one end projecting from said vertical axis toward the periphery of the trailer so that the one end can be grasped by a person actuating the container support; and means for connecting the operating handle with the other end of the shaft portion of the cone so that rotational movement of the operating handle, about said vertical axis and in a plane substantially parallel to said horizontal plane results in a corresponding rotational movement of the head portion of the cone.

13. The improved container support described in claim 12 wherein a member is formed on the platform and depends from the lower surface of the platform such that the lower end of the depending member is below said horizontal plane; and wherein the mounting means includes means for connecting the lower end of the depending member with the trailer so that the platform may be pivotally moved about the generally horizontal axis between its first position and its second position.

14. The improved container support described in claim 13 wherein the trailer has a deck and a side rail which includes an upward, inwardly directed flange and which extends along and defines the sides of the deck of the trailer; and wherein the portion of the structural member is the upper flange of the side rail of the trailer.

15. The improved container support described in claim 14 which includes a second plate; second means for mounting the second plate on the upper flange of the side rail of the trailer; and wherein the mounting means mounts the platform on the second plate.

16. The improved container support described in claim 15 wherein the second means for mounting the second plate on the upper flange of the side rail includes means for permitting the second plate to be moved relative to the side rail along a direction parallel to the longitudinal axis of the side rail.

* * * * *